United States Patent
Suzuki et al.

(10) Patent No.: US 8,131,436 B2
(45) Date of Patent: Mar. 6, 2012

(54) SPEED CHANGE CONTROL SYSTEM OF AUTOMATIC TRANSMISSION

(75) Inventors: Masami Suzuki, Mishima (JP); Goh Endo, Yokohama (JP)

(73) Assignee: JATCO Ltd, Fuji-shi (JP)

( * ) Notice: Subject to any disclaimer, the term of this patent is extended or adjusted under 35 U.S.C. 154(b) by 423 days.

(21) Appl. No.: 12/487,120

(22) Filed: Jun. 18, 2009

(65) Prior Publication Data

US 2009/0319142 A1    Dec. 24, 2009

(30) Foreign Application Priority Data

Jun. 19, 2008    (JP) ................. 2008-160704

(51) Int. Cl.
*F16H 59/20* (2006.01)
*F16D 48/12* (2006.01)
*G06F 19/00* (2006.01)

(52) U.S. Cl. ............... 701/51; 701/54; 701/58; 477/107

(58) Field of Classification Search ................ 701/51, 701/54, 58, 66; 477/107, 123, 98
See application file for complete search history.

(56) References Cited

U.S. PATENT DOCUMENTS

| | | | |
|---|---|---|---|
| 4,671,139 A | 6/1987 | Downs et al. | |
| 4,953,090 A * | 8/1990 | Narita | 701/66 |
| 5,795,265 A | 8/1998 | Domian et al. | |
| 5,857,935 A | 1/1999 | Takiguchi | |
| 6,259,983 B1 * | 7/2001 | Tsutsui et al. | 701/51 |
| 6,508,736 B2 | 1/2003 | Saito | |
| 6,514,165 B2 | 2/2003 | Saito | |
| 6,543,593 B2 | 4/2003 | Saito | |
| 6,616,576 B2 | 9/2003 | Saito | |
| 7,912,614 B2 * | 3/2011 | Honma et al. | 701/51 |
| 2002/0034999 A1 | 3/2002 | Saito | |
| 2002/0035011 A1 | 3/2002 | Saito | |
| 2008/0039286 A1 | 2/2008 | Asami et al. | |

FOREIGN PATENT DOCUMENTS

| | | |
|---|---|---|
| DE | 198 54 624 A1 | 6/1999 |
| EP | 0 719 967 A2 | 7/1996 |
| EP | 0 900 957 A2 | 3/1999 |
| EP | 1 188 965 A2 | 3/2002 |
| JP | 10-047464 A | 2/1998 |
| JP | 10-047469 A | 2/1998 |
| JP | 2000-110929 A | 4/2000 |
| JP | 2000-352459 A | 12/2000 |
| JP | 2001-065682 A | 3/2001 |
| JP | 2002-089674 A | 3/2002 |

OTHER PUBLICATIONS

U.S. Appl. No. 12/481,058, filed Jun. 9, 2009, Sato et al.
U.S. Appl. No. 12/487,025, filed Jun. 18, 2009, Sato et al.
O. Sato, U.S. PTO Office Action, U.S. Appl. No. 12/487,025, dated Dec. 27, 2011, 8 pages.

* cited by examiner

*Primary Examiner* — Tan Q Nguyen
(74) *Attorney, Agent, or Firm* — Foley & Lardner LLP (57) ABSTRACT

When it is judged that a vehicle speed detected by a vehicle speed sensor is equal to or lower than a predetermined very low value, that is, for example, 5 km/h, the hydraulic pressure applied to an engaging-side frictional element is sharply increased, sharply reduced and then held higher than a given value capable of effecting a piston stroke of a corresponding piston unit until a time when the piston stroke is completed. Upon completion of the piston stroke, the hydraulic pressure is increased to a maximum value in a time that is smaller or shorter than that set when the detected vehicle speed is higher than the predetermined very low value.

11 Claims, 4 Drawing Sheets

|  | B1<br>Fr/B | C1<br>I/C | C2<br>D/C | C3<br>H&LR/C | B2<br>LOW/B | B3<br>2346/B | B4<br>R/B | F1 | F2 |
|---|---|---|---|---|---|---|---|---|---|
| 1ST | (○) |  |  | (○) | ○ |  |  | ○ | ○ |
| 2ND |  |  |  | (○) | ○ | ○ |  |  | ○ |
| 3RD |  |  | ○ |  | ○ | ○ |  |  |  |
| 4TH |  |  | ○ | ○ |  | ○ |  |  |  |
| 5TH |  | ○ | ○ | ○ |  |  |  |  |  |
| 6TH |  | ○ |  | ○ |  | ○ |  |  |  |
| 7TH | ○ | ○ |  | ○ |  |  |  | ○ |  |
| REV. | ○ |  |  | ○ |  |  | ○ |  |  |

SPEED CHANGE CONTROL SYSTEM OF AUTOMATIC TRANSMISSION

BACKGROUND OF THE INVENTION

1. Field of the Invention

The present invention relates to speed change control systems of an automatic transmission, and more particularly to the speed change control systems of a type that allows the transmission to exhibit a higher speed change response (viz., a rapid operation response to a speed change instruction) when the vehicle is running at a very slow speed inducing a difficulty in accurately detecting the vehicle speed.

2. Description of the Related Art

As is known, when a motor vehicle runs at a very low speed, it is practically impossible or at least difficult to accurately detect the vehicle speed and/or the gear ratio of the automatic transmission, which are needed for appropriately controlling operation of the automatic transmission.

In order to compensate a delayed response of speed change inevitably exhibited by an automatic transmission at the time when the motor vehicle runs at such very slow speed, Japanese Laid-open Patent Application (tokkai) 2002-089674 discloses a unique technique. In the technique, a command hydraulic pressure of a hydraulic system of the transmission is increased at a certain increasing rate or stepwise at the time when a speed change is carried out under the very low speed running of the vehicle. With such increase of the command hydraulic pressure, the speed change of the automatic transmission is effected quickly.

SUMMARY OF THE INVENTION

When, in the above-mentioned known speed change control system of the automatic transmission, exact vehicle speed detection is not effected by a vehicle speed sensor, increasing the command hydraulic pressure is simply carried out without considering any other factors that may be needed for properly controlling the speed change response of the automatic transmission.

Accordingly, when the increasing rate of the command hydraulic pressure is set high, undesired speed change shock tends to occur at the time when a clutch is engaged upon completion of a piston stroke although a speed change time (viz., a time needed for completing the speed change) can be reduced. While, when the increasing rate is set low, the speed change time can not be reduced although the undesired shock can be reduced.

Accordingly, an object of the present invention is to provide a speed change control system of an automatic transmission, which is free of the above-mentioned drawbacks.

That is, in accordance with the present invention, there is provided a speed change control system of an automatic transmission, which establishes both suppression of the shock and reduction of the speed change time of the transmission at the time when a speed change of the transmission is carried out under a very low speed running of the vehicle.

In accordance with a first aspect of the present invention, there is provided a speed change control system of an automatic transmission mounted on a motor vehicle, the transmission having a first frictional element that changes its operation condition from a disengaged condition to an engaged condition upon issuance of a speed change instruction, a second frictional element that changes its operation condition from an engaged condition to a disengaged condition upon issuance of the speed change instruction, a vehicle speed sensor that detects a speed of the vehicle and a control device that controls a hydraulic pressure applied to the first frictional element based on information on a target gear ratio, the speed change control system comprising a judge section that judges whether or not the vehicle speed detected by the vehicle speed sensor is equal to or lower than a predetermined very low value; a very low vehicle speed pre-charge control section that, when, upon issuance of the speed change instruction, the judge section judges that the vehicle speed detected by the vehicle speed sensor is equal to or lower than the predetermined very low value, sharply increases the hydraulic pressure applied to the first frictional element, sharply reduces the hydraulic pressure and then holds the hydraulic pressure higher than a given value capable of effecting a piston stroke of a corresponding piston unit for the first friction element until a time when the piston stroke is completed; and a very low vehicle speed phase control section that, upon completion of the piston stroke, increases the hydraulic pressure to a maximum level in a time that is shorter than that set when the vehicle speed detected by the vehicle speed sensor is higher than the predetermined very low value.

In accordance with a second aspect of the present invention, there is provided a speed change control system of an automatic transmission mounted on a motor vehicle, the transmission having a first frictional element that changes its operation condition from a disengaged condition to an engaged condition upon issuance of a speed change instruction, a second frictional element that changes its operation condition from an engaged condition to a disengaged condition upon issuance of the speed change instruction, a vehicle speed sensor that detects a speed of the vehicle and a control device that controls a hydraulic pressure applied to the first frictional element based on information on a target gear ratio, the control device being configured to carry out judging whether the speed change instruction has been issued or not; judging whether or not the vehicle speed detected by the vehicle speed sensor is equal to or lower than a predetermined very low value; when it is judged that the speed change instruction has been issued and the detected vehicle speed is equal to or lower than the predetermined very low value, sharply increasing the hydraulic pressure applied to the first frictional element, sharply reducing the hydraulic pressure and then holding the hydraulic pressure higher than a given value capable of effecting a piston stroke of a corresponding piston unit for the first friction element until a time when the piston stroke is completed; and when the piston stroke in completed, increasing the hydraulic pressure to a maximum level in a time that is shorter than that set when the vehicle speed detected by the vehicle speed sensor is higher than the predetermined very low value.

In accordance with a third aspect of the present invention, there is provided a method of controlling an automatic transmission mounted on a motor vehicle, the transmission having a first frictional element that changes its operation condition from a disengaged condition to an engaged condition upon issuance of a speed change instruction, a second frictional element that changes its operation condition from an engaged condition to a disengaged condition upon issuance of the speed change instruction a vehicle speed sensor that detects a speed of the vehicle and a control device that controls a hydraulic pressure applied to the first frictional element based on information on a target gear ratio, the method comprising judging whether the speed change instruction has been issued or not; judging whether or not the vehicle speed detected by the vehicle speed sensor is equal to or lower than a predetermined very low value; when it is judged that the speed change instruction has been issued and the detected vehicle speed is equal to or lower than the predetermined very low value, sharply increasing the hydraulic pressure applied to the first frictional element, sharply reducing the hydraulic pressure and then holding the hydraulic pressure higher than a given value capable of effecting a piston stroke of a corresponding piston unit for the first frictional element until a time when the piston stroke is completed; and when the piston stroke is completed, increasing the hydraulic pressure to a maximum level in a time that is shorter than that set when the vehicle speed detected by the vehicle speed sensor is higher than the predetermined very low value.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a speed change control system of an automatic transmission according to the present invention will be described in detail with reference to the accompanying drawings.

Figure 1:
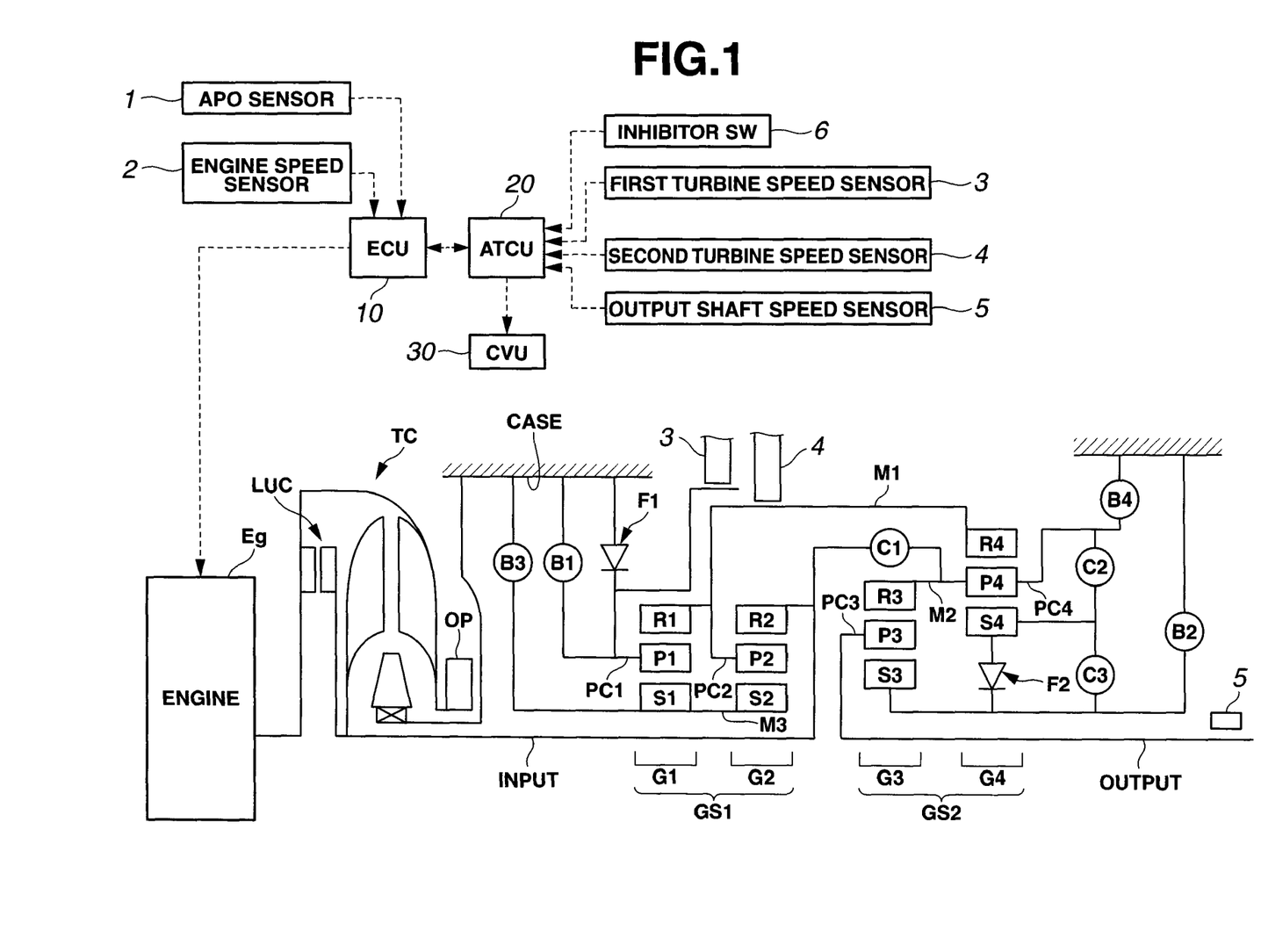
FIG. 1 is a skeleton view of an automatic transmission to which a speed change control system of the present invention is practically applied.

Referring to FIG. 1, there is schematically shown an automatic transmission to which the speed change control system of the present invention is practically applied.

The automatic transmission shown in FIG. 1 is of a type having seven forward speeds and one reverse speed.

As shown in the drawing, a drive force produced by an engine "Eg" is inputted to an input shaft "Input" through a torque converter "TC". The input drive force is treated by four planetary gear units "G1, G2, G3 and G4" and seven frictional elements "C1, C2, C3, B1, B2, B3 and B4" to be subjected to a rotation speed change and transmitted to an output shaft "Output".

An oil pump "OP" is coaxially mounted on a pump impeller of the torque converter "TC", so that the oil pump "OP" compresses a hydraulic liquid (or oil) by the power of the engine "Eg"

An engine controller (ECU) 10 is arranged to control operation of the engine "Eg", and an automatic transmission controller (ATCU) 20 is arranged to control operation of the automatic transmission. There is further provided a control valve unit (CVU) 30 that, based on instruction signals from the automatic transmission controller 20, controls hydraulic pressure applied to the frictional elements.

As shown, the engine controller 10 and the automatic transmission controller 20 are connected through CAN (Controller Area Network) communication line so that respective information, such as information signals from various sensors, instruction signals from the controller 10 or 20 and the like, is jointly owned by the controllers 10 and 20.

Each of the engine controller 10 and automatic transmission controller 20 contains a microcomputer that includes a CPU (central processing unit), a RAM (random access memory), a ROM (read only memory) and Input and Output interfaces.

Into the engine controller 10, there are inputted an information signal issued from an accelerator sensor 1 that detects a depressed degree of an accelerator pedal and an information signal issued from an engine speed sensor 2 that detects a rotation speed of the engine "Eg". Processing the information signals from the accelerator sensor (APO) 1 and the engine speed sensor 2, the engine controller 10 controls an amount of fuel injected into each engine cylinder of the engine and an open degree of a throttle valve installed in an air intake system of the engine. That is, by processing the information signals, the engine controller 10 controls an engine power, an engine speed and an engine torque.

Into the automatic transmission controller 20, there are inputted an information signal issued from a first turbine speed sensor 3 that detects a rotation speed of a first carrier "PC1", an information signal issued from a second turbine speed sensor 4 that detects a rotation speed of a first ring gear "R1", an information signal issued from an output shaft speed sensor 5 that detects a rotation speed of the output shaft "Output", and an information signal issued from an inhibitor switch 6 that detects a speed range selected by a driver through a shift lever. When, for example, D-range is selected, the automatic transmission controller 20 determines a suitable speed with reference to an existing vehicle speed "Vsp" and an existing open degree of the throttle valve, and feeds the control valve unit 30 with an instruction signal that causes the transmission to take the suitable speed.

In the following, a speed change gear mechanism installed between the input and output shafts will be described with the aid of FIG. 1.

As is seen from FIG. 1, around a common axis of the input and output shafts "Input" and "Output", there are disposed a first planetary gear set GS1 that includes a first planetary gear G1 and a second planetary gear G2 and a second planetary gear set GS2 that includes a third planetary gear G3 and a fourth planetary gear G4.

Furthermore, as frictional elements, there are employed a first clutch C1, a second clutch C2, a third clutch C3, a first brake B1, a second brake B2, a third brake B3 and a fourth brake B4. In addition thereto, there are further employed a first one-way clutch F1 and a second one-way clutch F2.

The first planetary gear G1 is of a single pinion type which comprises a first sun gear S1, a first ring gear R1, first pinions P1 operatively interposed between the first sun gear S1 and the first ring gear R1, and a first carrier PC1 carrying the first pinions P1.

The second planetary gear G2 is of also a single pinion type which comprises a second sun gear S2, a second ring gear R2, second pinions P2 operatively interposed between the second sun gear S2 and the second ring gear R2, and a second carrier PC2 carrying the second pinions P2.

The third planetary gear G3 is of also a single pinion type which comprises a third sun gear S3, a third ring gear R3, third pinions P3 operatively interposed between the third sun gear S3 and the third ring gear R3, and a third carrier PC3 carrying the third pinions P3.

Third fourth planetary gear G4 is of also a single pinion type which comprises a fourth sun gear S4, a fourth ring gear R4, fourth pinions P4 operatively interposed between the fourth sun gear S4 and the fourth ring gear R4, and a fourth carrier PC4 carrying the fourth pinions P4.

As is seen from FIG. 1, the input shaft "Input" is connected to the second ring gear R2, so that an engine torque from the engine "Eg" is inputted to the second ring gear R2 through the torque converter TC. The output shaft "Output" is connected to the third carrier PC3, so that a torque of the third carrier PC3 is transmitted to drive road wheels (not shown) of the vehicle through a final gear (not shown).

The first ring gear R1, the second carrier PC2 and the fourth ring gear R4 are integrally connected through a first connecting member M1. The third ring gear R3 and the fourth carrier PC4 are integrally connected through a second connecting member M2, and the first sun gear S1 and the second sun gear S2 are integrally connected through a third connecting member M3.

For assembling the first planetary gear set GS1 that has four rotational elements, the first and second planetary gears G1 and G2 are connected by the first and third connecting members M1 and M3. For assembling the second planetary gear set GS2 that has five rotational elements, the third and fourth planetary gears G3 and G4 are connected by the second connecting member M2.

In the first planetary gear set GS1, a torque is transmitted from the input shaft "Input" to the second ring gear R2 and the transmitted torque at the second ring gear R2 is transmitted to the second planetary gear set GS2 through the first connecting member M1. In the second planetary gear unit GS2, a torque is transmitted from the input shaft "Input" directly to the second connecting member M2, and at the same time transmitted through the first connecting member M1 to the fourth ring gear R4. The torque thus transmitted is then transmitted to the output shaft "Output" through the third carrier PC3.

The first clutch C1 (or input clutch I/C) functions to selectively establish and disestablish an operative connection between the input shaft "Input" and the second connecting member M2, the second clutch C2 (or direct clutch D/C) functions to selectively establish and disestablish an operative connection between the fourth sun gear S4 and the fourth carrier PC4, and the third clutch C3 (or H & LR clutch H&LR/C) functions to selectively establish and disestablish an operative connection between the third sun gear S3 and the fourth sun gear S4.

The second one-way clutch F2 is arranged between the third sun gear S3 and the fourth sun gear S4. Thus, when, with the third clutch C3 being disengaged, the rotation speed of the fourth sun gear S4 is higher than that of the third sun gear S3, the third and fourth sun gears S3 and S4 rotate separately generating independent rotation speeds. Thus, a unit in which the third planetary gear G3 and the fourth planetary gear G4 are connected through the second connecting member M2 is established, so that the respective planetary gears G3 and G4 are permitted to have independent gear ratios respectively.

The first brake B1 (or front brake Fr/B) functions to selectively stop and permit rotation of the first carrier PC1 relative to a transmission case "Case". The first one-way clutch F1 is arranged in parallel with the first brake B1. The second brake B2 (or low brake LOW/B) functions to selectively stop and permit rotation of the third sun gear S3 relative to the transmission case "Case". The third brake B3 (or 2, 3, 4, 6 brake 2346/B) functions to selectively stop and permit rotation of the third connecting member M3 by which the first and second sun gears S1 and S2 are connected, relative to the transmission case "Case". The fourth brake B4 (or reverse brake R/B) functions to selectively stop and permit rotation of the fourth carrier PC4 relative to the transmission case "Case".

Figure 2:
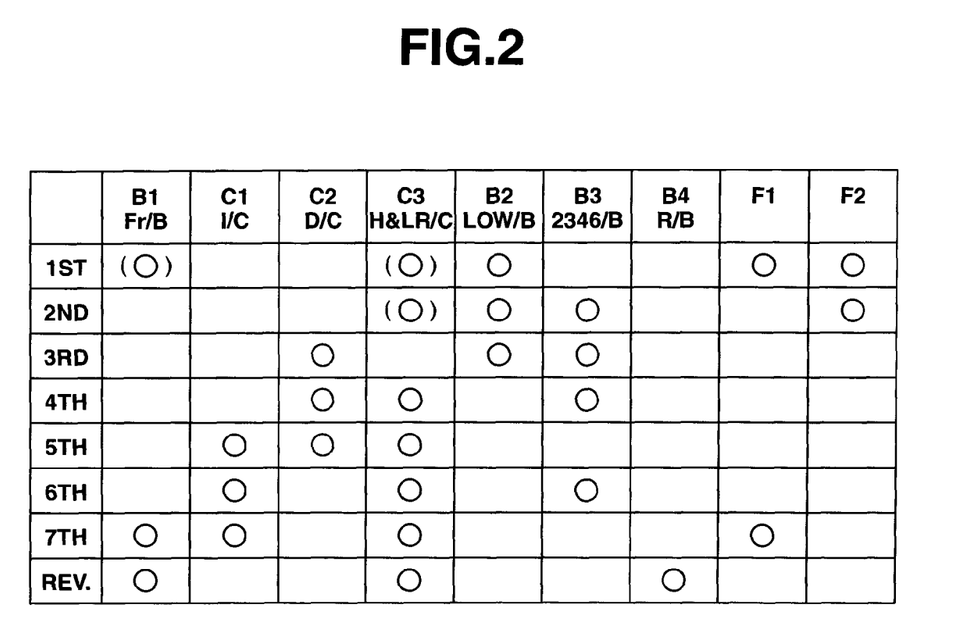
FIG. 2 is a table showing ON/OFF (or engaged/disengaged) condition of various frictional elements with respect to various speeds established by the automatic transmission.

FIG. 2 is a table showing ON/OFF (or engaged/disengaged) condition of the above-mentioned frictional elements C1 to C3, B1 to B4 and F1 to F2 with respect to speeds established by the automatic transmission to which the speed change control system of the present invention is applied. In the table, circle "○" indicates ON (or engaged) condition of the corresponding frictional element, bracketed circle "(○)" indicates ON (or engaged) condition of the corresponding frictional element at the time when an engine brake is carried out, and blank indicates OFF (disengaged) condition of the corresponding frictional element.

As will be described in the following and is understood from the table of FIG. 2, in order to carry out up-shifting or down-shifting between two neighboring speeds, ON condition of one frictional element is changed to OFF condition and at the same time OFF condition of another frictional element is changed to ON condition. That is, by carrying out a so-called ON/OFF switching speed change, seven forward speeds and one reverse are provided by the automatic transmission, which will be clarified from the following description.

That is, in first speed, only the second brake B2 takes ON condition. With this, the first and second one-way clutches F1 and F2 assume their ON condition. In the second speed, the second brake B2 and the third brake B3 take ON condition, and the second one-way clutch F2 assumes ON condition. In third speed, the second brake B2, the third brake B3 and the second clutch C2 take ON condition, and the first and second one-way clutches F1 and F2 assume their OFF condition. In fourth speed, the third brake B3, the second clutch C2 and the third clutch C3 take ON condition. In fifth speed, the first clutch C1, the second clutch C2 and the third clutch C3 take ON condition. In sixth speed, the third brake B3, the first clutch C1 and the third clutch C3 take ON condition. In seventh speed, the first brake B1, the first clutch C1 and the third clutch C3 take ON condition, and the first one-way clutch F1 assumes ON condition. In reverse, the fourth brake B4, the first brake B1 and the third clutch C3 take ON condition.

Figure 3:
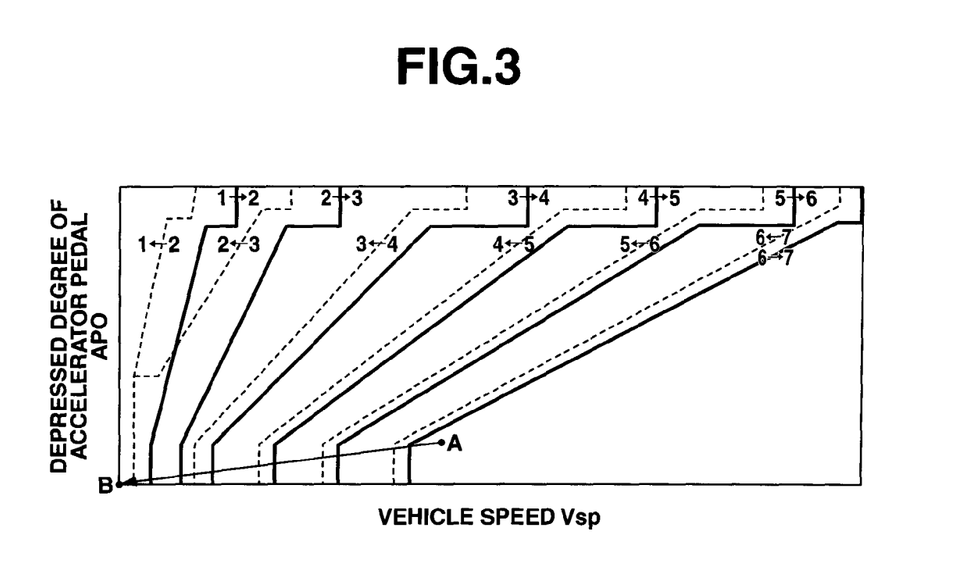
FIG. 3 is a speed change map showing speed change lines of the automatic transmission with respect to a vehicle speed and a depressed degree of an accelerator pedal, which is used by the speed change control system of the invention upon selection of D-range.

FIG. 3 shows a speed change map used by the speed change control system of the invention upon selection of D-range.

In the speed change map, solid lines are up-shifting lines that show speed change lines for up-shifting, while dotted lines are down-shift lines that show speed change lines for down-shifting.

That is, upon selection of D-range under cruising of a vehicle, a speed change point suitable for an existing vehicle operating condition is looked up in the speed change map with respect to both a vehicle speed "Vsp" detected by the output shaft speed sensor 5 and a depressed degree of an accelerator pedal detected by the accelerator sensor APO) 1.

If the speed change point thus looked up is in a speed range suitable for the existing vehicle operating condition, an instruction is issued from the automatic transmission controller 20 to keep the speed that has been kept in the transmission. If, thereafter, due to change of the existing vehicle operation condition, the speed change point looked up in the map appears in a higher speed range crossing one up-shifting line, an instruction is issued from the controller 20 to cause the transmission to carry out a shift-up operation.

If, thereafter, due to further change of the existing vehicle operation condition, the looked up speed change point appears in a lower speed range crossing one down-shifting line, an instruction is issued from the controller 20 to cause the transmission to carry out a shift-down operation.

Figure 4:
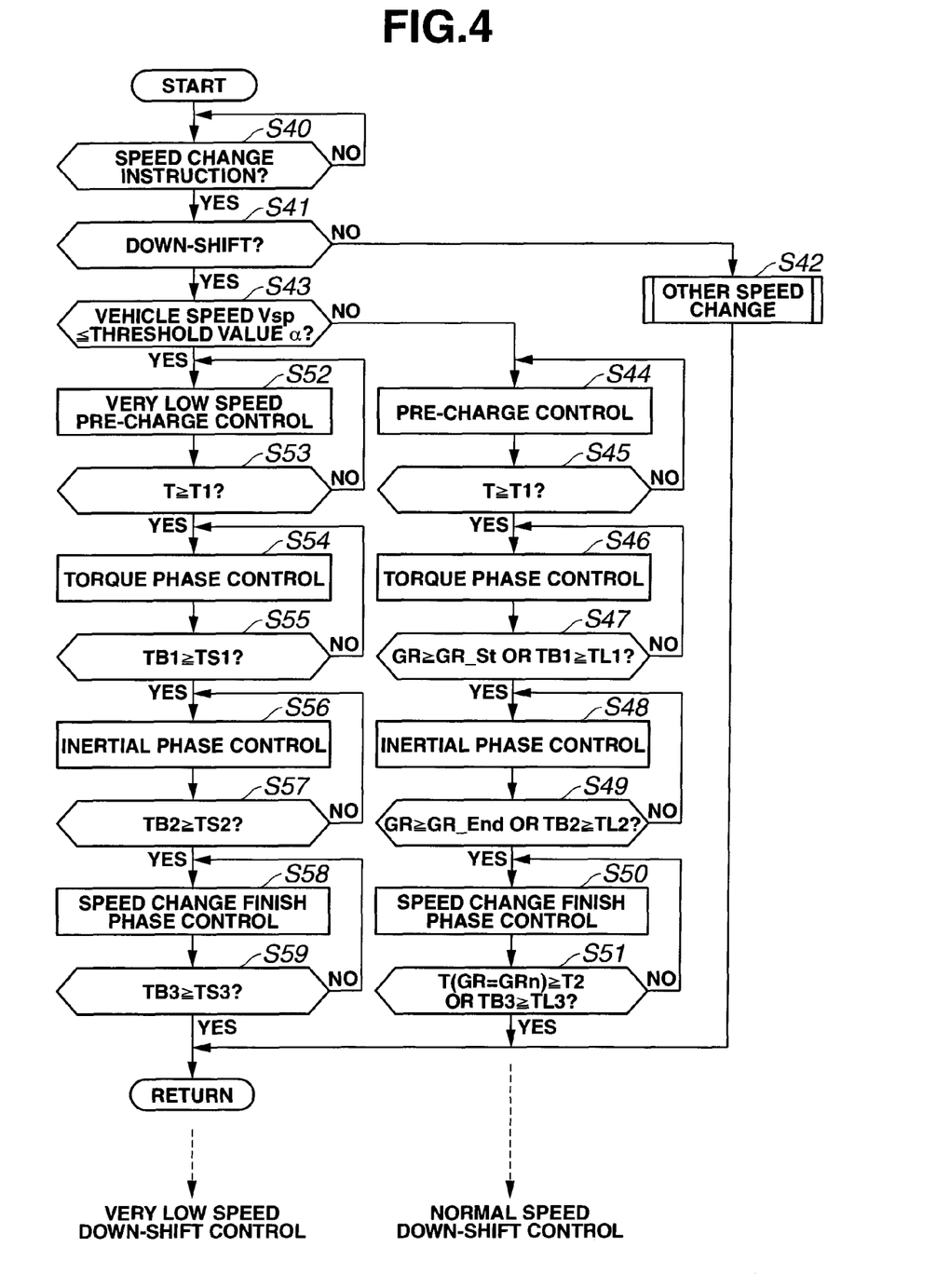
FIG. 4 is a flowchart of programmed operation steps that are carried out by a controller employed by the speed change control system of the present invention upon selection of D-range.

Referring to FIG. 4, there is shown a flowchart that depicts programmed operation steps that are executed in the automatic transmission controller 20 when, upon selection of D-range, a down-shift instruction is issued.

In the following, the operation steps of the flowchart will be described in detail with the aid of FIG. 4.

It is to be noted that under operation of the automatic transmission, the speed change control is constantly carried out in the automatic transmission controller 20. Thus, under operation of the transmission, information signals from the first turbine speed sensor 3, the second turbine speed sensor 4 and the output shaft speed sensor 5 are constantly fed to the controller 20 to calculate an actual gear ratio "GR" which is a ratio between the rotation speed of the input shaft "Input" and that of the output shaft "Output".

At step S40, judgment is carried out as to whether, in D-range, a speed change instruction has been issued or not. If YES, that is, when the speed change instruction has been issued, the operation flow goes to step S41. While, if NO, that is, when the speed change instruction has not been issued, the operation flow goes back to step S40.

At step S41, judgment is carried out as to whether or not the speed change instruction is for effecting a down-shift of the transmission induced by the above-mentioned so-called ON/OFF switching speed change. If YES, that is, when the instruction is for effecting the down-shift, the operation flow goes to step S43. While, if NO, that is, when the instruction is not for effecting the down-shift, the operation flow goes to step S42.

At step S42, judging that the speed change instruction is not for effecting the down-shift, the automatic transmission controller 20 carries out a different speed change control, which may be, for example, a control for effecting an up-shift from one speed range to an adjacent higher range, a control for effecting an up-shift from one speed range to a speed range that is higher than the speed range by two or more ranges or the like. Then, the operation flow goes to RETURN.

At step S43, judgment is carried out as to whether or not the vehicle speed "Vsp" is lower than or equal to a threshold value "α". If YES, that is, when "Vsp≦α" is established, the operation flow goes to step S52. While, if NO, that is, "Vsp>α" is established, the operation flow goes to step S44.

It is to be noted that the threshold value "α" is a highest one (or upper limit) of very low vehicle speeds at which an exact vehicle speed detection is not achieved by the output shaft speed sensor 5. For example, the threshold value "α" is set to about 5 km/h.

At step S44, judging that an exact vehicle speed detection is possible by the output shaft speed sensor 5, a so-called normal vehicle speed pre-charge control is carried out. That is, for the pre-charge control, frictional elements that will be respectively engaged and disengaged (which will be called "engaging-side (or first) frictional element" and "disengaging-side (or second) frictional element" hereinafter for ease of description) when the above-mentioned ON/OFF switching speed change for the down-shift is carried out are searched, and for completing a piston stroke of a corresponding piston unit, the hydraulic pressure applied to the engaging-side frictional element is sharply increased, then sharply reduced and then gradually increased until the time when the piston stroke is completed, and the hydraulic pressure applied to the disengaging-side frictional element for disengaging the same is reduced to a given level. Upon completion of the pre-charge control, the operation flow goes to step S45.

At step S45, judgment is carried out as to whether or not a time "T" counted from the time when the pre-charge control started is greater (or longer) than or equal to a first predetermined value "T1". If YES, that is, when the time "T" is larger than or equal to the first predetermined value "T1", the operation flow goes to step S46. While, if NO, that is, when the time "T" is smaller or shorter than the first predetermined value "T1", the operation flow goes back to step S44.

It is to be noted that the first predetermined value "T1" is a time that is needed for completing the piston stroke of the engaging-side frictional element at the time when the above-mentioned ON/OFF switching speed change for the down-shift is carried out.

At step S46, a so-called torque phase control is carried out. That is, for the torque phase control, in the process of speed change of the transmission, the hydraulic pressure applied to the engaging-side frictional element is increased and the hydraulic pressure applied to the disengaging-side frictional element is decreased during a period (or torque phase period) for which only the torque of the output shaft (Output) changes keeping the rotation speed of the input shaft (Input) unchanged in the process of speed change of the transmission. Upon completing the torque phase control, the operation flow goes to step S47.

At step S47, a first judgment as to whether or not the above-mentioned actual gear ratio "GR" is larger than or equal to a first predetermined gear ratio (or inertial phase start judging gear ratio) "GR-St", and a second judgment as to whether or not a first back-up time "TB1" counted from the time when the torque phase control started is greater than or equal to a first normal predetermined value "TL1" are carried out. If either one of the first and second judgments has issued YES, the operation flow goes to step S48. While, if both of the first and second judgments have issued NO, the operation flow goes back to S46.

Although not shown in the flowchart of FIG. 4, if YES is issued at step S47, the hydraulic pressure applied to the engaging-side frictional element is sharply increased to the lower limit indicated at the time when the torque phase control of step S56 was finished, and then the operation flow goes to step S48.

At step S48, a so-called inertial phase control is carried out. That is, for the inertial phase control, in the process of speed change of the transmission, the hydraulic pressure applied to the engaging-side frictional element is gradually increased and the hydraulic pressure applied to the disengaging-side frictional element is reduced during a period (or inertial phase period) for which the rotation speed of the input shaft "Input" is varied mainly by variation of inertial force of a drive system. Upon completion of the inertial phase control, the operation flow goes to step S49.

At step S49, a first judgment as to whether or not the actual gear ratio "GR" is larger than or equal to a second predetermined gear ratio (or inertial phase finish judging gear ratio) "GR-End", and a second judgment as to whether or not a second back-up time "TB2" counted from the time when the inertial phase control started is greater than or equal to a second normal predetermined value "TL2" are carried out. If either one of the first and second judgments has issued YES, the operation flow goes to step S50. While, if both of the first and second judgments have issued NO, the operation flow goes back to S48.

Although not shown in the flowchart of FIG. 4, if YES at step S49, the hydraulic pressure applied to the engaging-side frictional element is sharply increased to the lower limit at the time when a predetermined inertial phase control is finished, and then the operation flow goes to step S50.

At step S50, a so-called speed change finish phase control is carried out. That is, for the speed change finish phase control, judging that the actual gear ratio "GR" has reached a desired gear ratio (viz., the gear ratio established upon completion of the speed change), the hydraulic pressure applied to the engaging-side frictional element is increased to the maximum value and the hydraulic pressure applied to the disengaging-side frictional element is reduced to the minimum value (or drain level). Upon completion of the speed change finish phase control, the operation flow goes to step S51.

It is to be noted that the speed change finish phase control comprises a so-called synchronization judgment phase control that is carried out to the time when the actual gear ratio "GR" is judged to reach the desired gear ratio (viz., the gear ratio established upon completion of the speed change) and a so-called finish treatment control that starts upon judgment of the synchronization and ends when the hydraulic pressure applied to the engaging-side frictional element shows the maximum value and the hydraulic pressure applied to the disengaging-side frictional element shows the minimum value. Although not shown in the flowchart of FIG. 4, each of the synchronization judgment phase control and the finish treatment control is carried out with the aid of a back-up timer.

At step S51, a first judgment as to whether or not a time "T (GR=GRn)" counted from the time when the actual gear ratio "GR" has reached a next gear ratio "GRn" is greater (or longer) than or equal to a second predetermined value "T2" and a second judgment as to whether a third back-up time "TB3" counted from the time when the speed change finish phase control started is greater than or equal to a third predetermined value (or third normal set value) "YL3" are carried out. If either one of the first and second judgments has issued YES, the operation flow goes to RETURN. While, if both of the first and second judgments have issued NO, the operation flow goes back to step S50.

Although not shown in the flowchart of FIG. 4, if YES at step S51, the hydraulic pressure applied to the engaging-side frictional element is sharply increased to the maximum valve and then the operation flow goes to RETURN.

It is to be noted that the operation steps S44 to S51 are those executed in a normal vehicle speed controlling section of the automatic transmission controller 20.

Referring back to step S43, if YES at this step S43, that is, when "Vsp≦α" is established, the operation flow goes to step S52 judging that existing vehicle speed "Vsp" is too low to be accurately detected by the output shaft speed sensor 5.

At step S52, a so-called very low vehicle speed pre-charge control is carried out. That is, for the very low vehicle speed pre-charge control, frictional elements that will be respectively engaged and disengaged (which will be named "engaging-side frictional element" and "disengaging-side frictional element" hereinafter for ease of description) when the above-mentioned ON/OFF switching speed change for the down-shift is carried out are searched, and for completing a piston stroke of a corresponding piston unit, the hydraulic pressure applied to the engaging-side frictional element is sharply increased, then sharply reduced and then gradually increased until the time when the piston stroke is completed and the hydraulic pressure applied to the disengaging-side frictional element for disengaging the same is reduced to the minimum value (or drain level). Upon completion of the very low vehicle speed pre-charge control, the operation flow goes to step S53.

It is to be noted that in this very low vehicle speed pre-charge control of step S52, the hydraulic pressure applied to the disengaging-side frictional element is reduced to the minimum value (or drain level), and thus the very low vehicle speed pre-charge control of step S52 is different from the afore-mentioned simple pre-charge control of step S44.

Accordingly, when the very low vehicle speed pre-charge control is finished, only the hydraulic pressure applied to the engaging-side frictional element is controlled in subsequent three phase controls as will be clarified in the following.

At step S53, judgment is carried out as to whether or not a time "T" counted from the time when the very low vehicle speed pre-charge control started becomes greater (or longer) than or equal to a first predetermined value "T1".

It is to be noted that like in the case of the above-mentioned step S45, the first predetermined value "T1" is a time that is needed for completing the piston stroke of the engaging-side frictional element at the time when the ON/OFF switching speed change for the down-shift is carried out.

If YES at step S53, that is, when the time "T" is greater than or equal to the first predetermined value "T1", the operation flow goes to step S54. While if NO, that is, when the time "T" is smaller or shorter than the first predetermined value "T1", the operation flow goes back to step S52.

At step S54, a so-called torque phase control similar to that of the above-mentioned step S46 is carried out. However, in the step S54, only the hydraulic pressure applied to the engaging-side frictional element is increased in the process of speed change of the transmission. That is, the hydraulic pressure applied to the disengaging-side friction element has already reduced to the minimum value (or drain level). Upon completion of the torque phase control of step S54, the operation flow goes to step S55.

At step S55, judgment is carried out as to whether or not a first back-up time "TB1" counted from the time when the torque phase control started is greater than or equal to a first predetermined reduced value "TS1" which is smaller than the above-mentioned value "TL1". If YES, that is, when it is judged that the time "TB1" is greater than or equal to the first predetermined reduced value "TS1", the operation flow goes to step S56. While, if NO, that is, when it is judged that the time "TB1" is smaller or shorter than the first predetermined reduced value "TS1", the operation flow goes back to step S54.

Although not shown in the flowchart, if YES is issued at step S56, the hydraulic pressure applied to the engaging-side frictional element is sharply increased to the lower limit indicated at the time when the torque phase control of step S54 was finished, and then the operation flow goes to step S56.

At step S56, a so-called inertial phase control similar to that of the above-mentioned step S48 is carried out. In the step S56, the hydraulic pressure applied to the engaging-side frictional element is gradually increased in the process of speed change of the transmission. The hydraulic pressure applied to the disengaging-side frictional element is kept to the drain level for the reason as has been described hereinabove. Upon completion of the inertial phase control at step S56, the operation flow goes to step S57.

At step S57, judgment is carried out as to whether or not a second back-up time "TB2" counted from the time when the inertial phase control started is greater than or equal to a second predetermined reduced value "TS2" (which is smaller than the above-mentioned value "TL2"). If YES, that is, when it is judged that the second back-up time "TB2" is greater than or equal to the second predetermined reduced value "TS2", the operation flow goes to step S58. While, if NO, that is, when it is judged that the second back-up time "TB2" is smaller or shorter than the second predetermined reduced value "TS2", the operation flow goes back to step 56.

Although not shown in the flowchart, if YES at step 57, the hydraulic pressure applied to the engaging-side frictional element is sharply increased to the lower limit indicated at the time when the inertia phase control of step S56 was finished, and then the operation flow goes to step S58.

At step S58, a so-called speed change finish phase control similar to that of the above-mentioned step S50 is carried out. In the step S58, the hydraulic pressure applied to the engaging-side frictional element is increased. For the reason as has been mentioned hereinabove, the hydraulic pressure applied to the disengaging-side frictional element is kept at the drain level. Upon completion of the speed change finish phase control of step S58, the operation flow goes to step S59.

At step S59, judgment is carried out as to whether or not a third back-up time "TB3" counted from the time when the speed change finish phase control of step S58 started is greater than or equal to a third predetermined reduced value "TS3" (which is smaller than the above-mentioned value "TB3" of step S51). If YES, that is, when it is judged that the value "TB3" is greater than or equal to the value "TS3", the operation flow goes to RETURN. While, if NO, that is, when it is judged that the value "TB3" is smaller than the value "TS3", the operation flow goes back to step S58.

If YES at step S59, the hydraulic pressure applied to the engaging-side frictional element is sharply increased to the maximum value, and then the operation flow goes to RETURN.

It is to be noted that the operation steps S54 to S59 are those executed in a very low vehicle speed controlling section of the automatic transmission controller 20.

In the following, operation of the speed change control system of the present invention will be described with the aid of the flowchart of FIG. 4.

For clarification, description on the operation will be directed to three distinctive operation modes, which are (A) Down-shift at a normal vehicle speed that assures an exact vehicle speed detection, (B) Down-shift at a very low vehicle speed that fails to assure the exact vehicle speed detection and (C) Rapid speed reduction from $7^{th}$ speed to $1^{st}$ speed through $6^{th}$, $4^{th}$ and $2^{nd}$ speeds.

(A) Down-shift at a normal vehicle speed that assures an exact vehicle speed detection:

When, under cruising of a vehicle that is running at a speed higher than 5 km/h that assures an exact vehicle speed detection, a driver depresses an accelerator with the intention of accelerating the vehicle, a down-shift instruction is issued from the automatic transmission controller 20.

That is, as is understood from the flowchart of FIG. 4, when, with the vehicle speed "Vsp" exceeding the threshold value "α", a down-shift instruction is issued, the operation flows in the direction of S40, S41, S43 and S44. Then, at step S44, the pre-charge control is carried out. That is, upon receiving such instruction, the hydraulic pressure for the engaging-side frictional element is sharply increased, then sharply reduced and then gradually increased to complete the piston stroke of a corresponding piston unit, and at the same time the hydraulic pressure for the disengaging-side frictional element is reduced to a predetermined level. The pre-charge control is continued by the steps S44 and S45 until the time "T" counted from the time when the pre-charge control started reaches or exceeds the first predetermined value "T1".

When the time "T" reaches or exceeds the first predetermined value "T1", the operation flows from step S45 to step S46. At step S46, in a torque phase appearing in the process of the speed change, the torque phase control is carried out wherein the hydraulic pressure for the engaging-side frictional element is increased and the hydraulic pressure for the disengaging-side frictional element is reduced. Such torque phase control is continued by steps S46 and S47 until either one of the judgments of step S47 issues YES answer.

When either one of the judgments of step S47 issues YES answer, the operation flow goes to S48. At step S48, the inertial phase control is carried out wherein in the inertial phase period appearing in the process of speed change, the hydraulic pressure for the engaging-side frictional element is gradually increased and the hydraulic pressure for the disengaging-side frictional element is reduced. Such inertia phase control is continued by steps 48 and 49 until either one of the judgments of step S49 issues YES answer.

When either one of the judgments of step S49 issues YES answer, the operation flow goes to step S50. At step S50, the speed change finish phase control is carried out wherein judging that the actual gear ratio "GR" has reached a desired gear ratio (viz., the gear ratio established upon completion of the speed change), the hydraulic pressure for the engaging-side frictional element is increased to the maximum value and the hydraulic pressure for the disengaging-side frictional element is reduced to the minimum value (or drain level). Such speed change finish phase control is continued by steps S50 and S51 until either one of the judgments of S51 issues YES answer.

When either one of the judgments of step S51 issues YES answer, the operation flow goes to RETURN thereby finishing the normal vehicle speed down-shift control.

As is described hereinabove, in the torque phase control, the inertial phase control and the speed change finish phase control of the normal vehicle speed down-shift control, the hydraulic pressure applied to the engaging-side frictional element is controlled based on the actual gear ratio "GR" (viz., current gear ratio).

However, when, in such controls, the actual gear ratio "GR", that has been provided by calculating detected values, shows an abnormal value due to for example a failure of the control system, it tends to occur that the speed change is not finished. For example, even if the actual speed change is under processing and thus the gear ratio is changing, the operation flow is forced to stop at either one of the phase controls when the actual gear ratio "GR" provided does not change.

Accordingly, in the normal vehicle speed down-shift control under cruising wherein the vehicle speed "Vsp" exceeds the threshold value "α", the torque phase control, inertial phase control and speed change finish phase control use the first, second and third back-up times "TB1", "TB2" and "TB3" respectively, and if the back-up time "TB1", "TB2" or "TB3" exceeds a predetermined time "TL1", "TL2" or "TL3", the corresponding phase control is carried out even if the condition of the gear ratio is not established. Accordingly, even if the actual gear ratio "GR" fails to show a proper value due to failure in detection, the three phase controls, viz., the torque phase control, inertial phase control and speed change finish phase control are assuredly carried out in order, and thus, the speed change is assuredly finished.

Figure 5:
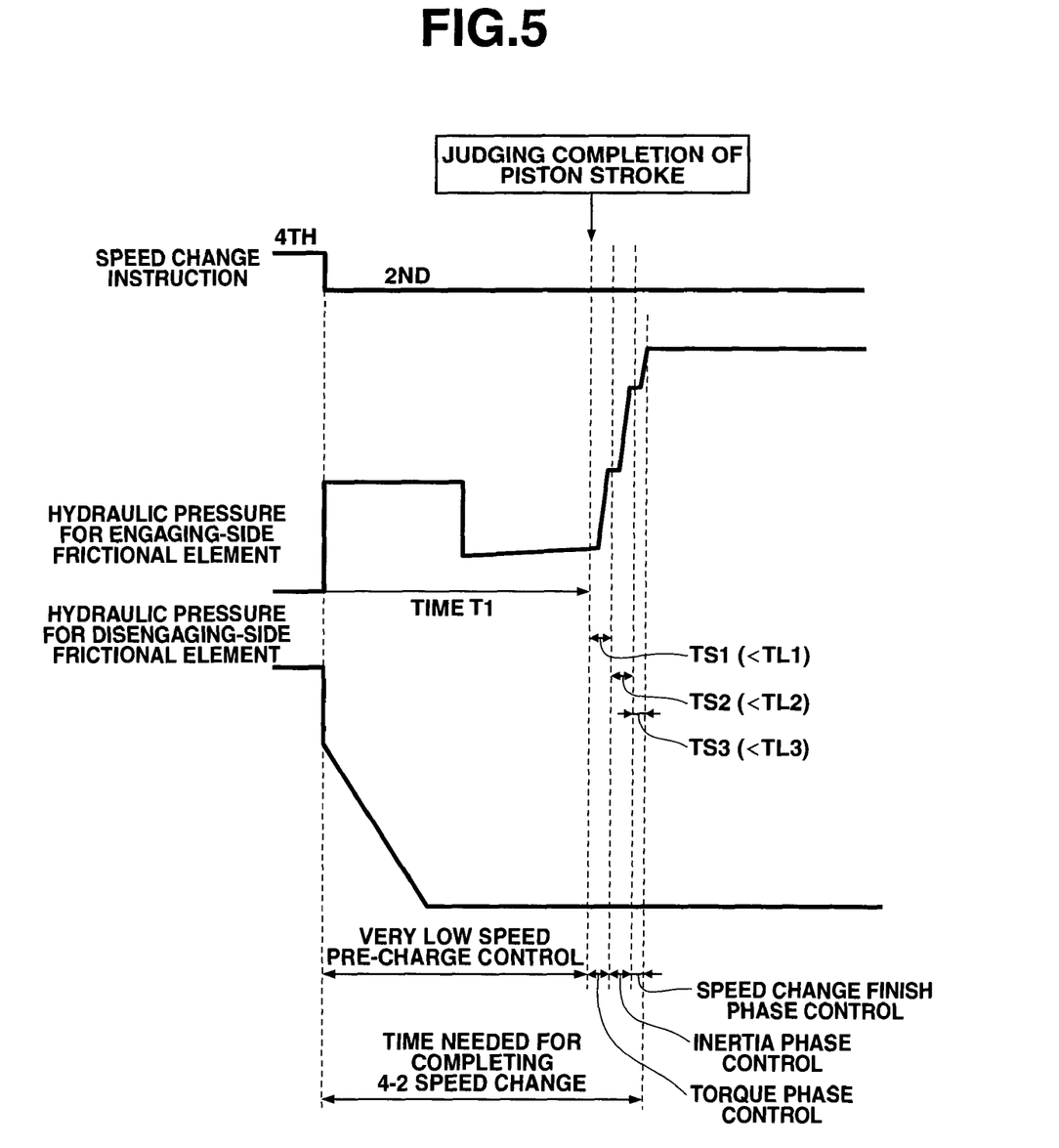
FIG. 5 is a time chart showing changes of speed change instruction, command hydraulic pressure for engaging-side frictional element and command hydraulic pressure for disengaging-side frictional element at the time when a downshift from $4^{th}$ speed to $2^{nd}$ speed is carried out by the transmission under a very slow running of an associated motor vehicle.

(B) Down-shift at a very low vehicle speed that fails to assure the exact vehicle speed detection:

This down-shift operation will be described with the aid of FIGS. 4 and 5. FIG. 5 is a time chart showing respective characteristics of speed change instruction, command hydraulic pressure for engaging-side frictional element and command hydraulic pressure for disengaging-side frictional element at the time when a down-shift from $4^{th}$ speed to $2^{nd}$ speed is carried out by the transmission under a very slow running of the associated motor vehicle.

For example, in a speed reduction case wherein an accelerator pedal is instantly released or a brake pedal is rapidly depressed under cruising of the vehicle, it occurs that a down-shift instruction is issued at a very low vehicle speed (for example, lower than 5 km/h) that does not assure an exact vehicle speed detection.

That is, as is seen from the flowchart of FIG. 4, when such down-shift instruction is issued at such a very low vehicle speed that is lower than the threshold value "α", the operation flows from step S40 to S52 through steps S41 and S43. At step S52, the pre-charge control is carried out, so that the hydraulic pressure for the engaging-side frictional element is rapidly increased, then rapidly reduced and then gradually increased until the time when a piston stroke of a corresponding piston unit is completed, and the hydraulic pressure for the disengaging-side frictional element is reduced to the minimum value (or drain level). This pre-charge control is kept by steps S52 and S53 until the time "T" counted from the time when the very low vehicle speed pre-charge control started becomes greater (or longer) than the first predetermined value "T1".

When the time "T" reaches or exceeds the first predetermined value "T1", the operation flows from step S53 to S54. At step S54, the torque phase control is carried out, so that the hydraulic pressure for the engaging-side frictional element is increased leaving the hydraulic pressure for the disengaging-side frictional element at the minimum value (or drain level). The torque phase control is continued by steps S54 and S55 until the first back-up time "TB1" counted from the time when the torque phase control started becomes greater than the first predetermined reduced value "TS1".

When the first back-up time "TB1" becomes greater than the first predetermined reduced value "TS1", the operation flows from step S55 to step S56. At step S56, the inertial phase control is carried out, so that the hydraulic pressure for the engaging-side frictional element is increased leaving the hydraulic pressure for the disengaging-side frictional element at the minimum value (or drain level). The inertial phase control is continued by steps S56 and S57 until the second back-up time "TB2" counted from the time when the inertial phase control started becomes greater than the second predetermined reduced value "TS2".

When the second back-up time "TB2" becomes greater than the second predetermined reduced value "TS2", the operation flows from step S57 to step S58. At step S58, the speed change finish phase control is carried out, so that the hydraulic pressure for the engaging-side frictional element is increased leaving the hydraulic pressure for the disengaging-side frictional element at the minimum value (or drain level). The speed change finish phase control is continued by steps S58 and S59 until the third back-up time "TB3" counted from the time when the speed change finish phase control started becomes greater than the third predetermined reduced value "TS3".

When the third back-up time "TB3" becomes greater than the third predetermined reduced value "TS3", the operation flow goes to RETURN completing the very low vehicle speed down-shift control.

As is described hereinabove, when the vehicle is running at a very slow speed that can not be exactly detected by the output shaft speed sensor 5 (or vehicle speed sensor), the very low vehicle speed pre-charge control is carried out by steps S52 and S53 completing the piston stroke for the hydraulic pressure applied to the engaging-side frictional element, and at the same time, the hydraulic pressure applied to the disengaging-side frictional element is reduced to the minimum value (or drain level). When it is judged that the very low vehicle speed pre-charge control is finished, three phase controls are carried out each being of a type wherein the hydraulic pressure for the engaging-side frictional element is increased to the maximum value in a time that is shorter than a time set when the vehicle runs at a speed that assures an exact speed detection.

That is, when the vehicle speed is very low and thus exact speed detection can not be carried out by the output shaft speed sensor 5, the control from the start of the speed change to the end of the same is configured to comprise the very low vehicle speed pre-charge control that is carried out just after starting of the speed change and the three phase controls that are carried out one after another as the speed change progresses. In the very low vehicle speed pre-change control, the hydraulic pressure for the engaging-side frictional element is sharply increased and then sharply reduced for instantly completing a piston stroke of a corresponding piston unit and at the same time, the hydraulic pressure for the disengaging-side frictional element is reduced to the minimum value (viz., drain level). Wish such pressure control, undesired shock, which would occur upon completion of the piston stroke, is suppressed or at least minimized. Actually, when an accelerator pedal is depressed in the process of piston stroke or when a down-shift is carried out in a very low speed cruising of the vehicle, a remarkable shock tends to occur. However, in the invention, such undesirable shock is suppressed or at least minimized because of employment of the very low vehicle speed pre-change control.

In each of the three phase controls, the hydraulic pressure for the engaging-side frictional element is increased to a high value in a shorten time.

Accordingly, the time needed for completing the speed change is reduced as compared with the time needed in the normal vehicle speed down-shift control that is carried out when the vehicle runs at a speed (higher than 5 km/h) that assures an exact vehicle speed detection by the output shaft speed sensor 5.

As is understood from the time chart of FIG. 5, in case of a down shift from $4^{th}$ speed to $2^{nd}$ speed, the pressure increasing of the hydraulic pressure for the engaging-side frictional element, which is carried out in the torque phase control, is kept until the time (viz., first back-up time) "TB1" counted from the time when the torque phase control started shows the first predetermined reduced value "TS1" which is smaller than the predetermined value "TL1" set in the normal vehicle speed down-shift control, the pressure increasing of the hydraulic pressure, which is carried out in the inertial phase control, is kept until the time (viz., second back-up time) "TB2" counted from the time when the inertial phase control started shows the second predetermined reduced value "TS2" which is smaller than the predetermined value "TL2" set in the normal vehicle speed down-shift control, and the pressure increasing of the hydraulic pressure, which is carried out in the speed change finish phase control, is kept until the time (viz., third back-up time) "TB3" counted from the time when the speed change finish phase control started shows the third predetermined reduced value "TS3" which is smaller than the predetermined value "TL3" set in the normal vehicle speed down-shift control. Accordingly, the time needed for completing the piston stroke for the hydraulic pressure applied to the engaging-side frictional element is smaller than that needed in the normal vehicle speed down-shift control.

The time (ΔT) that is reduced in the very low vehicle speed down-shift control as compared with the normal vehicle speed down-shift control is expressed by the following equation:

$$\Delta T = (TL1-TS1)+(TL2-TS2)+(TL3-TS3) \quad (1)$$

As is described hereinabove, in the present invention, in each of the three phase controls subsequent to the very low vehicle speed pre-charge control, the predetermined reduced value "TS1", "TS2" or "TS3" is set smaller than the predetermined value "TL1", "TL2" or "TL3" set in the normal vehicle speed shift-down control. Thus, the time needed from the time when the piston stroke is completed to the time when the speed change is completed can be reduced.

Accordingly, in the present invention, there is no need of providing the automatic transmission controller (ATCU) 20 with an exclusive control logic for the very low vehicle speed. That is, as will be understood from the foregoing description and from the flowchart of FIG. 4, only by providing, beside the known normal vehicle speed down-shift control part, a so-called very low vehicle speed down-shift control part, the present invention is established.

(C) Rapid speed reduction from $7^{th}$ speed to $1^{st}$ speed through $6^{th}$, $4^{th}$ and $2^{nd}$ speeds:

Operation of this rapid speed reduction will be described in the following with the aid of the speed change map of FIG. 3.

When, with the vehicle running at $7^{th}$ speed with a speed change point at "A" in the map of FIG. 3, a driver rapidly releases an accelerator pedal or rapidly depresses a brake pedal with the intention of rapidly decelerating the vehicle, the speed change point is shifted from the point "A" to the point "B" in accordance with the rapid reduction of the vehicle speed. Under such condition, there may induce a case wherein when the vehicle speed reduces to a very low speed lower than 5 km/h, for example, 0 km/h at which exact vehicle speed detection is not effected, a down-shift instruction from $7^{th}$ speed to $1^{st}$ speed is issued from an automatic transmission controller. Actually, when, due to such rapid deceleration, drive road wheels of the vehicle are subjected to a brake locked condition or a condition almost identical to the brake locked condition, a vehicle speed "Vsp" derived from the information signal issued from the output shaft speed sensor 5 tends to show about 0 km/h.

When such down-shift instruction from $7^{th}$ speed to $1^{st}$ speed is issued, a speed change is carried out from $7^{th}$ speed to $1^{st}$ speed through four subsequent down-shifts which are, as is understood from the table of FIG. 2, a $7^{th}$ speed to $6^{th}$ speed down-shift wherein the third brake B3 is engaged and the first brake B1 is released, a $6^{th}$ speed to $4^{th}$ speed down-shift wherein the second clutch C2 is engaged and the first clutch C1 is released, a $4^{th}$ speed to $2^{nd}$ speed down-shift wherein the second brake B2 is engaged and the second clutch C2 is released and a $2^{nd}$ speed to $1^{st}$ speed down-shift wherein the first brake B1 is engaged and the third brake B3 is released.

It has been revealed that if the above-mentioned very low vehicle speed down-shift control is not employed, the vehicle speed indication "0 km/h" forces the actual gear ratio to show 0 (zero). In this case, a speed change control based on the actual gear ratio "GR" can not be carried out, and thus it is presumed that the down-shift from $7^{th}$ speed to $1^{st}$ speed needs about 10 seconds.

If the down-shift from $7^{th}$ speed to $1^{st}$ speed takes about 10 seconds, the following undesired phenomenon takes place. That is, when, just after a rapid deceleration, an accelerator pedal is rapidly depressed for re-acceleration, the re-acceleration is forced to start from a higher speed not from $1^{st}$ speed. That is, the down-shift to $1^{st}$ speed is not finished prior to starting of the re-acceleration. In view of this undesirable phenomenon, in case of a rapid deceleration, the down-shift from a higher speed to a lower speed should be made as quickly as possible.

Contrary to the above, in the speed change control system of the present invention, there is employed the above-mentioned very low vehicle speed shift-down control by which (a) a rapid or speedy down-shift is obtained, (b) a down-shift control not based on a gear ratio is employed and (c) a speed change progress after completion of a piston stroke for the engaging-side frictional element is established. In order to realize (a) and (b), the torque phase control at steps S54 and S55, the inertial phase control at steps S56 and S57 and the speed change finish phase control at steps S58 and S59 are employed, and in order to realize (c), the very low vehicle speed pre-charge control at steps S52 and S53 is employed.

In the above-mentioned down-shift from $7^{th}$ speed to $1^{st}$ speed, four down-shifts are successively carried out, which are $7^{th}$ speed to $6^{th}$ speed down-shift, $6^{th}$ speed to $4^{th}$ speed down-shift, $4^{th}$ speed to $2^{nd}$ speed down-shift and $2^{nd}$ speed to $1^{st}$ speed down-shift. In each of the four-shifts, the pre-charge control is effected to achieve a rapid piston stroke of a corresponding piston unit for a corresponding frictional element. Thus, undesired shock, which would occur upon completion of the piston stroke in each of the four down-shifts, is suppressed or at least minimized.

Furthermore, in each of the three phase controls that are carried out after completion of the pre-charge control, the first, second and third predetermined reduced values "TS1", "TS2" and "TS3" are set smaller than the corresponding predetermined values "TL1", "TL2" and "TL3" that are set in the normal vehicle speed down-shift control. Accordingly, the time needed for completing the down-shift from $7^{th}$ speed to $1^{st}$ speed is remarkably reduced as compared with a known automatic transmission that does not employ means that corresponds to the above-mentioned very low vehicle speed down-shift control.

If each of the predetermined reduced values "TS1", "TS2" and "TS3" is set to about 50% of the corresponding predetermined value "TL1", "TL2" or "TL3", the time needed for completing the down-shift from $7^{th}$ speed to $1^{st}$ speed can be reduced to about 50% of the time needed in the known automatic transmission.

Accordingly, in the present invention, when, with a vehicle running at a very low speed (lower than 5 km/h), a down-shift instruction is issued, a desired down-shift is speedily carried out suppressing or at least minimizing a shift shock.

In the following, modifications of the present invention will be described.

In the foregoing, at step S52 that carries out the very low vehicle speed pre-charge control, it is described so that for completing the piston stroke of the corresponding piston unit, the hydraulic pressure applied to the engaging-side (or first) frictional element is sharply increased, then sharply reduced and then gradually increased until the time when the piston stroke is completed. However, if desired, the hydraulic pressure for the engaging-side frictional element that is sharply reduced after being sharply increased may be held higher than a given value capable of effecting the piston stroke until the time when the piston stroke is completed. Furthermore, if desired, such technique of holding the hydraulic pressure higher than the given value may be also applied to the step S44 wherein the normal vehicle speed pre-charge control is carried out.

In the foregoing, in the very low vehicle speed down-shift control, the first, second and third predetermined values "TS1", "TS2" and "TS3" are set small to reduce the time needed for completing the speed change. If desired, after completion of the piston stroke, the hydraulic pressure for the engaging-side frictional element may be increased to the maximum value stepwise.

In the foregoing, in each of the torque phase control, inertial phase control and speed change finish phase control, all of the first, second and third predetermined values "TS1", "TS2" and "TS3" are set small. However, if desired, only one or two of the values may be set small.

In the foregoing, control for the hydraulic pressure applied to the engaging-side frictional element at a so-called power off down-shift operation is explained. However, if desired, the control for the hydraulic pressure may be applied to a so-called power on up-shift operation.

In the foregoing, an example applied to an automatic transmission having seven forward speeds and one reverse is explained. However, of course, the present invention is applicable to other automatic transmissions.

The entire contents of Japanese Patent Application 2008-160704 filed Jun. 19, 2008 are incorporated herein by reference.

Although the invention has been described above with reference to the embodiment of the invention, the invention is not limited to such embodiment as described above. Various modifications and variations of such embodiments may be carried out by those skilled in the art, in light of the above description.

What is claimed is:

1. A speed change control system of an automatic transmission mounted on a motor vehicle, the transmission having a first frictional element that changes its operation condition from a disengaged condition to an engaged condition upon issuance of a speed change instruction, a second frictional element that changes its operation condition from an engaged condition to a disengaged condition upon issuance of the speed change instruction, a vehicle speed sensor that detects a speed of the vehicle and a control device that controls a hydraulic pressure applied to the first frictional element based on information on a target gear ratio, the speed change control system comprising:
a judge section that judges whether or not the vehicle speed detected by the vehicle speed sensor is equal to or lower than a predetermined very low value;
a very low vehicle speed pre-charge control section that, when, upon issuance of the speed change instruction, the judge section judges that the vehicle speed detected by the vehicle speed sensor is equal to or lower than the predetermined very low value, sharply increases the hydraulic pressure applied to the first frictional element, sharply reduces the hydraulic pressure and then holds the hydraulic pressure higher than a given value capable of effecting a piston stroke of a corresponding piston unit for the first frictional element until a time when the piston stroke is completed; and
a very low vehicle speed phase control section that, upon completion of the piston stroke, increases the hydraulic pressure to a maximum level in a time that is shorter than that set when the vehicle speed detected by the vehicle speed sensor is higher than the predetermined very low value.

2. A speed change control system as claimed in claim 1, in which the predetermined very low value is the lowest one of a vehicle speed range that is exactly detected by the vehicle speed sensor.

3. A speed change control system as claimed in claim 2, in which the predetermined very low value is approximately 5 km/h.

4. A speed change control system as claimed in claim 1, in which the operation of the very low vehicle speed pre-charge control section is continued until a time counted from the time when the very low vehicle speed pre-charge control started reaches or exceeds a predetermined value.

5. A speed change control system as claimed in claim 1, in which the very low vehicle speed phase control section comprises:
a torque phase control section that, upon completion of the operation of the very low vehicle speed pre-charge control section, increases the hydraulic pressure until a time-counted from the time when the operation of the torque phase control section started reaches or exceeds a first predetermined reduced value that is smaller than that set when the vehicle speed detected by the vehicle speed sensor is higher than the predetermined very low value;
an inertia phase control section that, upon completion of the operation of the torque phase control section, increases the hydraulic pressure until a time counted from the time when the operation of the inertial phase control section started reaches or exceeds a second predetermined reduced value that is smaller than that set when the vehicle speed detected by the vehicle speed sensor is higher than the predetermined very low value; and
a speed change finish phase control section that, upon completion of the operation of the inertial phase control section, increases the hydraulic pressure until a time counted from the time when the operation of the speed change finish control section started reaches or exceeds a third predetermined reduced value that is smaller than that set when the vehicle speed detected by the vehicle speed sensor is higher than the predetermined very low value.

6. A speed change control system as claimed in claim 5, in which each of the first, second and third predetermined reduced values is set to about 50% of the corresponding predetermined value set when the vehicle speed detected by the vehicle speed sensor is higher than the predetermined very low value.

7. A speed change control system as claimed in claim 1, further comprising:
a normal vehicle speed pre-charge control section that, when, upon issuance of a speed change instruction, the judge section judges that the vehicle speed detected by the vehicle speed sensor is higher than the predetermined very low value, sharply increases the hydraulic pressure applied to the first frictional element, sharply reduces the hydraulic pressure and then holds the hydraulic pressure higher than a given value capable of effecting a piston stroke of a corresponding piston unit for the first frictional element until a time when the piston stroke is completed; and
a normal vehicle speed phase control section that, upon completion of the operation of the normal vehicle speed pre-charge control section, increases the hydraulic pressure applied to the first frictional element and reduces the hydraulic pressure applied to the second frictional element until one of two judgments issues YES answer, the two judgments being a first judgment as to whether or not an actual gear ratio reaches a desired next gear ratio and a second judgment as to whether or not a time counted from the time when the operation of the normal vehicle speed phase control section started reaches or exceeds a predetermined value.

8. A speed change control system as claimed in claim 1, in which the automatic transmission is of a type having seven forward speeds and one reverse speed.

9. A speed change control system as claimed in claim 1, in which the vehicle speed sensor is a speed sensor that detects a rotation speed of an output shaft of the automatic transmission.

10. A speed change control system of an automatic transmission mounted on a motor vehicle, the transmission having a first frictional element that changes its operation condition from a disengaged condition to an engaged condition upon issuance of a speed change instruction, a second frictional element that changes its operation condition from an engaged condition to a disengaged condition upon issuance of the speed change instruction, a vehicle speed sensor that detects a speed of the vehicle and a control device that controls a hydraulic pressure applied to the first frictional element based on information on a target gear ratio, the control device being configured to carry out:

judging whether the speed change instruction has been issued or not;

judging whether or not the vehicle speed detected by the vehicle speed sensor is equal to or lower than a predetermined very low value;

when it is judged that the speed change instruction has been issued and the detected vehicle speed is equal to or lower than the predetermined very low value, sharply increasing the hydraulic pressure applied to the first frictional element, sharply reducing the hydraulic pressure and then holding the hydraulic pressure higher than a given value capable of effecting a piston stroke of a corresponding piston unit until a time when the piston stroke is completed; and when the piston stroke is completed, increasing the hydraulic pressure to a maximum level in a time that is shorter than that set when the vehicle speed detected by the vehicle speed sensor is higher than the predetermined very low value.

11. A method of controlling an automatic transmission mounted on a motor vehicle, the transmission having a first frictional element that changes its operation condition from a disengaged condition to an engaged condition upon issuance of a speed change instruction, a second frictional element that changes its operation condition from an engaged condition to a disengaged condition upon issuance of the speed change instruction a vehicle speed sensor that detects a speed of the vehicle and a control device that controls a hydraulic pressure applied to the first frictional element based on information on a target gear ratio, the method comprising:

judging whether the speed change instruction has been issued or not;

judging whether or not the vehicle speed detected by the vehicle speed sensor is equal to or lower than a predetermined very low value;

when it is judged that the speed change instruction has been issued and the detected vehicle speed is equal to or lower than the predetermined very low value, sharply increasing the hydraulic pressure applied to the first frictional element, sharply reducing the hydraulic pressure and then holding the hydraulic pressure higher than a given value capable of effecting a piston stroke of a corresponding piston unit until the piston stroke is completed; and when the piston stroke is completed, increasing the hydraulic pressure to a maximum level in a time that is shorter than that set when the vehicle speed detected by the vehicle speed sensor is higher than the predetermined very low value.

* * * * *